United States Patent

Yu

Patent Number: 5,371,541
Date of Patent: Dec. 6, 1994

[54] PHASE-CONVERTING CIRCUIT FOR SUPERIMPOSE CONTROL

[75] Inventor: Ho-yong Yu, Suwon, Rep. of Korea

[73] Assignee: Samsung Electronics Co., Ltd., Kyungki, Rep. of Korea

[21] Appl. No.: 174,812

[22] Filed: Dec. 29, 1993

[30] Foreign Application Priority Data

Dec. 29, 1992 [KR] Rep. of Korea ............... 92-27046

[51] Int. Cl.$^5$ .................. H04N 5/262; H04N 5/278
[52] U.S. Cl. .................. 348/239; 348/589; 348/600; 348/520; 358/906
[58] Field of Search ............ 348/239, 536, 537, 539, 348/549, 578, 584, 589, 599, 600, 642, 647, 522, 512, 514, 517, 520; 358/909.1, 906, 22, 183; H04N 5/262, 5/278

[56] References Cited

U.S. PATENT DOCUMENTS 5,016,112  5/1991  Nakajima .............. 348/239

FOREIGN PATENT DOCUMENTS 2262776  10/1990  Japan.

*Primary Examiner*—Victor R. Kostak
*Assistant Examiner*—Sherrie Hsia
*Attorney, Agent, or Firm*—Sughrue, Mion, Zinn, Macpeak & Seas

[57] ABSTRACT

A superimpose control device which enables a superimpose function even in a VTR mode, by using a phase convening circuit for synchronizing the phase of a sub-carrier signal with the color burst signal of an applied video signal. The device includes a memory for storing the signal applied through a camera as title data; a luminance/chrominance signal separator for isolating only the color signal from either of the applied video signals; an automatic color signal control circuit for regulating the color burst signal level using the color signals output from the luminance/chrominance signal separator and those from a video reproduction circuit, as an input signal; a phase difference detector for detecting phase differences between the signal output from the automatic color signal control circuit and the sub-carrier signal; an oscillator for synchronizing the sub-carrier signal with the phase of the color burst signal and for outputting the result in accordance with the output signal of the phase difference detector; a phase-converting circuit for convening the phase of the sub-carrier signal output from the oscillator; a color modulator for modulating the color difference signal of the title data read from the memory by the output signal of the phase converting circuit; an adder for adding the output signal of the color modulator and the luminance signal output from the memory, and a selector for selectively outputting the output signal of the adder and the signal applied to a video camera system.

4 Claims, 5 Drawing Sheets

FIG. 2A
FIG. 2B
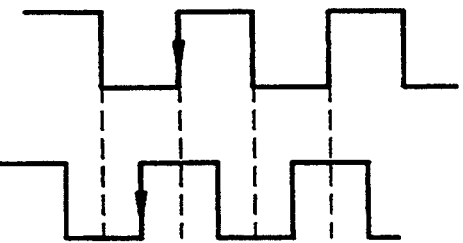
FIG. 3A
FIG. 3B
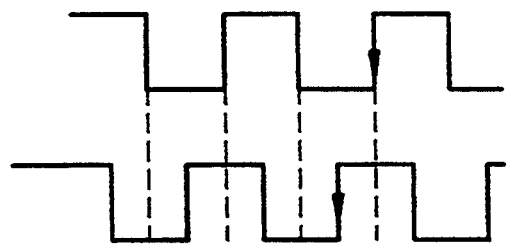
FIG. 4
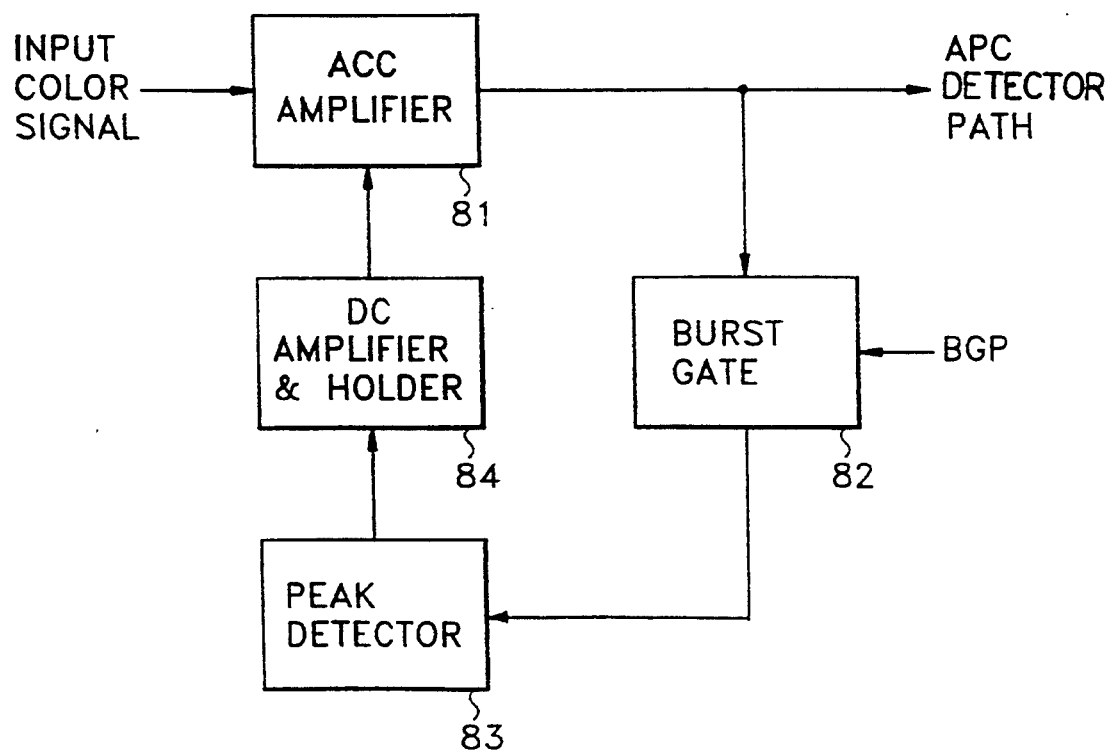

FIG. 9
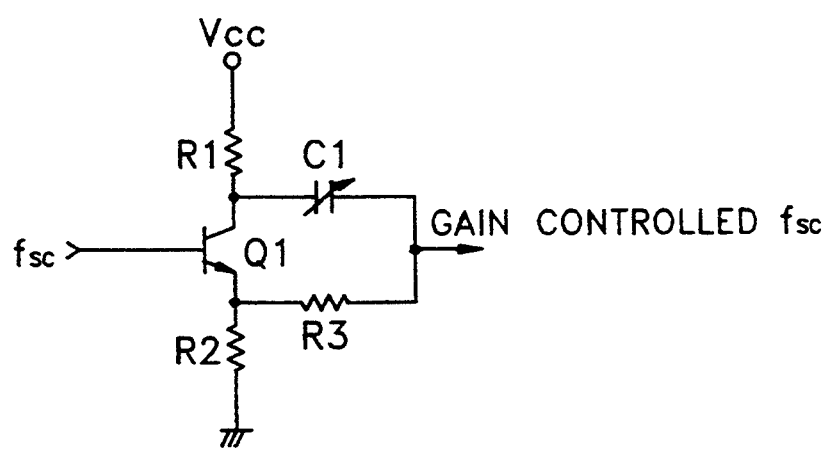
FIG. 10A
FIG. 10B
FIG. 10C
FIG. 10D
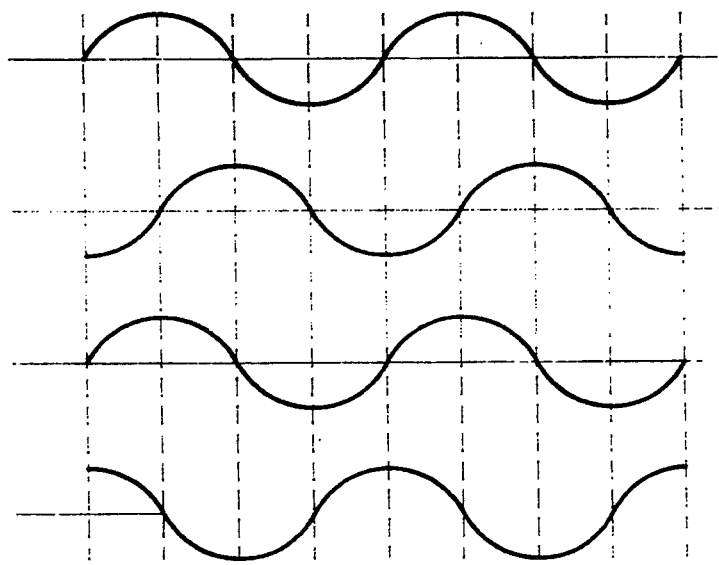

PHASE-CONVERTING CIRCUIT FOR SUPERIMPOSE CONTROL

The following disclosure is based on Republic of Korea Patent application No. 92-27046, filed on Dec. 29, 1992, which is incorporated into this application by reference.

BACKGROUND OF THE INVENTION

The present invention relates to a superimpose control device which overlaps the screen, and more particularly, to a superimpose control device which enables a superimpose function to be performed by means of a phase control between input signals having mutually different phases in a video camera system.

To superimpose a video signal, the phase of a sub-carrier signal ($f_{sc}$) has to be identical with that of a color burst signal between the superimposed video signals. For this reason, performing a superimpose function is possible for the conventional video camera systems when the phases of color burst signals and the sub-carrier signals between the input signal applied to a camera and the title signals to be superimposed, are fixed and set to a camera mode.

However, for the conventional technology, when the set mode is not a camera mode but rather a VTR mode, the superimpose function cannot be utilized since the phases for an externally applied video signal (E—E video), for the color burst signal of the play-back video signal (PB video) and for the sub-carrier signal are not compatible.

SUMMARY OF THE INVENTION

Accordingly, it is an object of the present invention to provide a superimpose control device which uses a phase-converting circuit for synchronizing the phase of a sub-carrier with a color burst signal of an applied video signal, in order to enable the use of a superimpose function even in a VTR mode.

To accomplish the above object, there is provided a superimpose control device of a video camera system having a camera and video recording and reproduction circuit, comprising:
- a memory for storing a video signal which is applied through the camera by a user's control into a title data;
- a luminance/chrominance signal separator for separating and outputting only the chrominance signal from either of the video signals output from the camera or applied from an external video input terminal of the video camera system;
- an automatic chrominance signal control circuit for controlling a level of a color burst signal in order to maintain a constant color burst signal level of the applied color signal using either the chrominance signal output from the luminance/chrominance signal separator or the chrominance signal of the video signal output from the video reproduction circuit as an input signal;
- a phase difference detector for detecting the phase difference between the signal output from the automatic chrominance signal control circuit and the sub-carrier;
- an oscillator for outputting the sub-carrier synchronized with the phase of the color burst signal, by the phase difference output from the phase difference detector;
- a phase-converting circuit for converting and outputting the phase of the sub-carrier output from the oscillator according to the recording or reproduction mode;
- color modulation means for modulating the color difference signal of the title data read from the memory by the signal output from the phase-converting circuit;
- an adder for outputting a composite video signal by adding the signal output from the color modulation means and the luminance signal of the title data output from the memory; and
- selection means for selectively outputting the signal output from the adder and the video signal applied to the video camera system.

BRIEF DESCRIPTION OF THE DRAWINGS

The above objects and other advantages of the present invention will become more apparent by describing in detail a preferred embodiment thereof with reference to the attached drawings in which:

FIGS. 2A and 2B show the output form of sub-carrier ($f_{sc}$) when recorded by a VTR;

FIGS. 3A and 3B show the output form of sub-carrier ($f_{sc}$) when reproduced by a VTR;

FIG. 4 is a detailed circuit diagram of an automatic color control (ACC) circuit of the system shown in FIG. 1;

FIG. 9 illustrates an embodiment for each of the delay circuits shown in FIG. 6; and FIGS. 10A to 10D are waveform charts showing the signal output from the phase-converting circuit of FIG. 1 in accordance with the embodiment of FIG. 9.

DETAILED DESCRIPTION OF THE INVENTION

The present invention will be described below in more detail with reference to the attached drawings.

Figure 1:
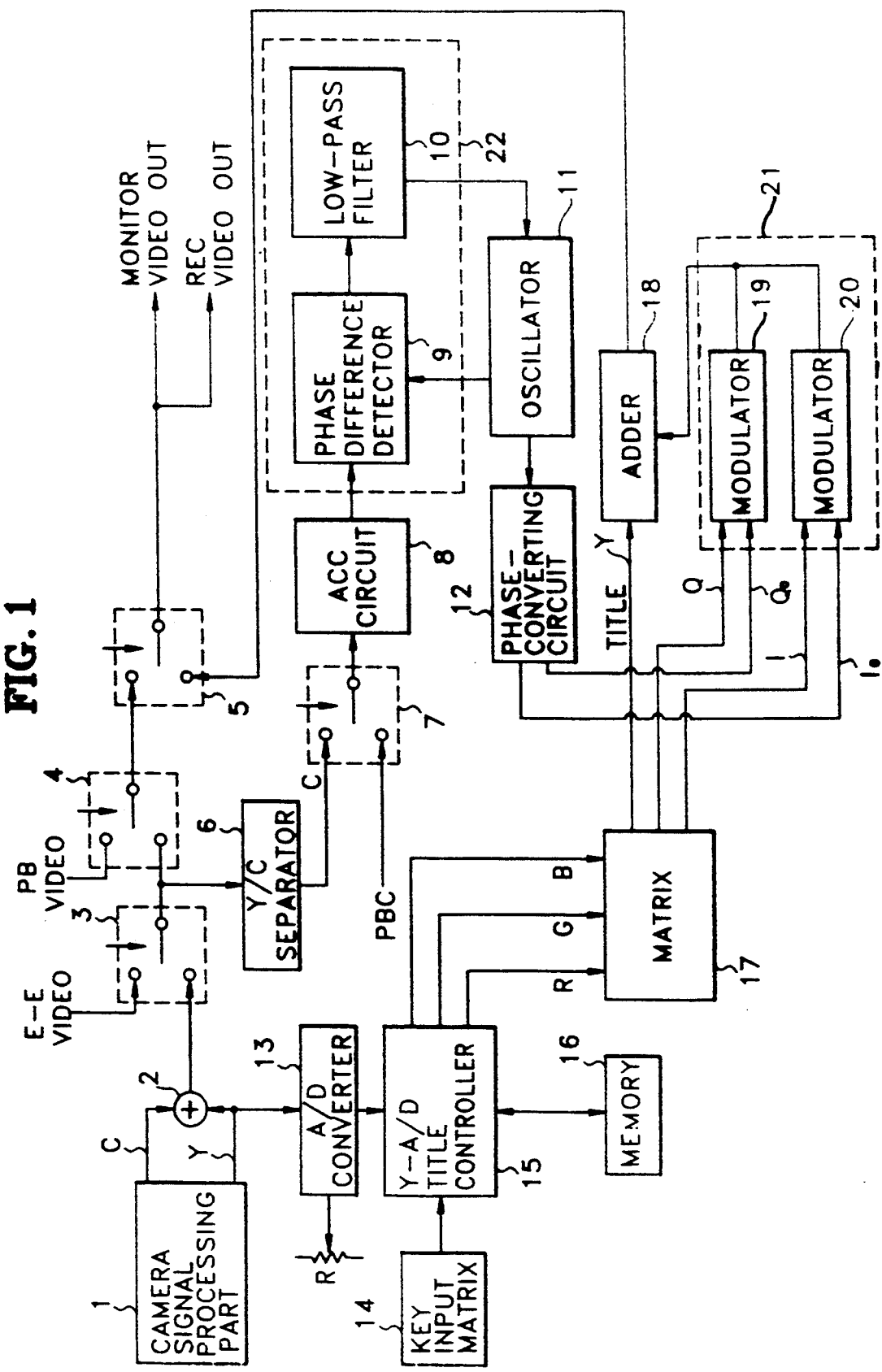
FIG. 1 is a system view showing a phase-converting device for superimpose control according to the present invention.

FIG. 1 is a system view showing a phase converting device for superimpose control according to the present invention;

Referring to FIG. 1, reference numeral 1 denotes a camera signal processor for processing the visual signal applied through the camera, i.e., one of the input means of the video signal, into an electrical signal, and for outputting the result. Reference numeral 2 denotes a mixer for mixing the luminance and the color signals respectively output from camera signal processor 1. Reference numeral 13 denotes an A/D converter for converting the luminance signal output from camera signal processor 1 into a digital signal according to a sampling level determined by a resistance (R), and for outputting the result. Reference numeral 14 denotes a key input matrix for providing user control commands and information. Reference numeral 15 denotes a title controller for controlling, via key input matrix 14, a function of transforming the signal output from camera signal processor 1 into title data. Reference numeral 16 denotes a memory for storing the signal output from A/D converter 13 and controlled by title controller 15, into a predetermined address. Reference numeral 17 denotes a matrix circuit for outputting the luminance signal and the color difference signal of the in-phase (I) and quadrature phase (Q) signal when the in digital title data stored in memory 16 is read as R, G and B signals through title controller 15 by the control signal output from key input matrix 14. Reference numeral 3 denotes a first selector for selectively outputting either the composite video signal output from mixer 2 or the video signal (E—E video) applied from an external terminal. Reference numeral 4 denotes a second selector for selectively outputting either the signal output from first selector 3 or the reproduction signal output from a video reproduction circuit (not shown). Reference numeral 6 denotes a luminance/chrominance signal separator for outputting a color signal after separating it from the image signal output from first selector 3. Reference numeral 7 denotes a third selector for selectively outputting either the color signal output frown luminance/chrominance signal separator 6 or the color signal output from the video reproduction circuit (not shown). Reference numeral 8 denotes an automatic color signal control circuit for controlling the resulting color signal so as to maintain a constant burst level of the color signal output from third selector 7. Reference numeral 9 denotes a phase difference detector for detecting a phase difference between the signal output from automatic color signal control circuit 8 and the sub-carrier provided from oscillator 11. Reference numeral 10 denotes a low-pass filter for outputting the signal output from phase difference detector 9 as a voltage value. Reference numeral 11 denotes an oscillator for outputting the sub-carrier to the automatic phase control detector 9 and also for outputting a phase of the color burst signal synchronized with the sub-carrier, in accordance with the signal output from low-pass filter 10. Reference numeral 12 denotes a phase-converting circuit for converting and outputting the phase of the sub-carrier output from oscillator 11 during recording and reproduction. Reference numeral 19 denotes a Q-modulator for outputting a color signal using the amplitude-modulated Q-color difference signal of the title data output from matrix 17 and the $Q_0$-color difference signal output from phase converting circuit 12, as input signals. Reference numeral 20 denotes an I-modulator for outputting a color signal using the amplitude-modulated I-color difference signal of the title data output from matrix 17 and $I_0$-color difference signal output from phase converting circuit 12, as input signals. Reference numeral 18 denotes an adder for adding the color signals output from Q modulator 19 and I-modulator 20 and the title luminance signal output from matrix 17, and for outputting a composite video signal. Reference numeral 5 denotes a fourth selector for selectively outputting the signals output from adder 18 and second selector 4. Here, the signal output from fourth selector 5 is output to a video recording circuit so as to be recorded or output on a monitor, i.e., on a reproduction means. Here, phase difference detector 9 and low-pass filter 10 constitute an automatic phase control (APC) circuit 22 which controls the phase, and Q-modulator 19 and I-modulator 20 constitute a color signal modulator 21.

FIGS. 2A and 2B show the output form of the sub-carrier ($f_{sc}$) when recorded by VTR. FIG. 2A shows a burst signal, i.e., a reference signal, while FIG. 2B shows a sub-carrier. The sub-carrier lags by 90 degrees as compared with the burst signal when recorded. FIGS. 3A and 3B show the output form of the sub-carrier ($f_{sc}$) when reproduced by a VTR. FIG. 3A shows the sub-carrier, i.e., a reference signal, while FIG. 3B shows a burst signal. Here, the burst signal lags by 90 degrees as compared with the sub-carrier signal when recorded. Thus, to carry out a superimpose function, the phases of the color burst signal and the sub-carrier have to be synchronized with each other when recorded and reproduced.

As described above, the superimpose function cannot be used in the VTR mode in the conventional device, since the phasing synchronization reference is fixed to a camera only. This is due to the fact that, generally, the video signals applied when the mode is set to "VTR" and applied through a camera do not have burst signals of the same phase.

Accordingly, the present invention enables the use of a superimpose function even in the VTR mode, by controlling the phase conversion of a sub-carrier so that the sub-carrier is synchronized with a burst signal of the applied video signal.

FIG. 4 is a detailed circuit diagram for illustrating the operation of automatic color control circuit 8 used in the system shown in FIG. 1. FIG. 4 shows an ACC amplifier 81, a burst gate 82, a peak detector 83 and a DC amplifier & holder 84, which operate as follows.

When the color signal is applied through third selector 7, ACC amplifier 81 maintains a constant burst level of the applied color signal by controlling its gain. When the color signal output from ACC amplifier 81 is applied to burst gate 82, burst gate 82 is enabled only for a duration determined by an externally applied burst gate pulse (BGP) signal, thereby sampling the burst signal. When the burst signal sampled by the BGP signal is input to peak detector 83, the peak level of the burst signal is detected. The voltage of the peak level detected from peak detector 83 is input to DC amplifier & holder 84, which acts as comparator, where it is compared with a predetermined voltage. The comparison result is output as a control signal for controlling the gain of ACC amplifier 81. The signal output from ACC amplifier 81 is output to phase difference detector 9 shown in FIG. 1.

Phase difference detector 9 and low-pass filter 10 shown in FIG. 1 together form an APC circuit 22 as mentioned above. The thus-formed APC circuit 22 is used for synchronizing the phase of the burst signal among the color signals applied from ACC circuit 8 with that of the sub-carrier needed for encoding the color signal for use in the title.

That is, when the color signal output from ACC amplifier 81 and a 3.58 MHz output of oscillator 11 are input to phase difference detector 9, phase difference detector 9 detects the phase difference between the burst signal and 3.58 MHz signal, by the BGP signal generated during the bursting period. The detected phase difference is detected as a voltage by low-pass filter 10. The APC error voltage detected from low-pass filter 10 is provided to oscillator 11. Oscillator 11 outputs the sub-carrier to be synchronized with the phase of the color burst signal of the color signal output by ACC amplifier 81, according to the signal output from low-pass filter 10.

Figure 5A:
FIGS. 5A to 5G is a timing view showing the error voltage output from an automatic phase control circuit between the color burst signal and the sub-carrier.
Figure 5B:
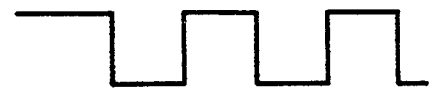
Figure 5C:
Figure 5D:
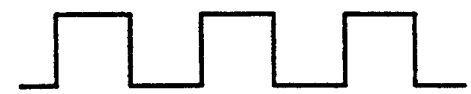
Figure 5E:
Figure 5F:
Figure 5G:
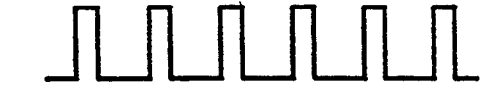

FIGS. 5A to 5G show an APC error voltage generated by the difference between the phase of the burst signal of the color signal output from ACC amplifier 81 and that of the sub-carrier output from oscillator 11. Here, FIG. 5A shows a burst signal, FIG. 5B shows a sub-carrier when the phase of the sub-carrier leads, FIG. 5C shows the APC error voltage detected when the phase of the sub-carrier leads as shown in FIG. 5B, FIG. 5D shows a sub-carrier when the phases of the burst signal and the sub-carrier are synchronized, FIG. 5E shows an APC error voltage of FIG. 5D, FIG. 5F shows a sub-carrier when the phase of the sub-carrier lags, and FIG. 5G shows the APC error voltage of FIG. 5F.

Figure 6:
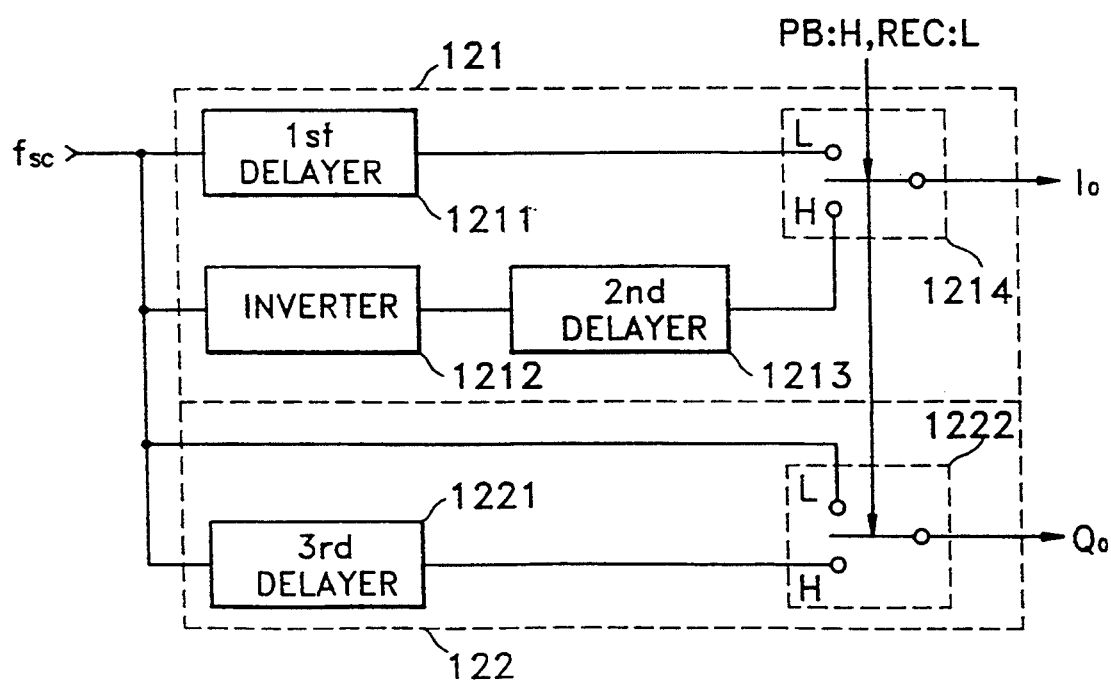
FIG. 6 is a detailed circuit diagram of the phase-converting circuit of FIG. 1.

FIG. 6 is a detailed circuit diagram of phase-converting circuit 12 of FIG. 1 according to the present invention. Here, first phase-converting means 121 is for outputting an I-color difference signal using a sub-carrier $f_{sc}$ output from oscillator 11, as an input signal, and second phase-converting means 122 is for outputting a Q-color difference signal using the sub-carrier $f_{sc}$ as an input signal.

More specifically, first phase converting means 121 comprises a first delayer 1211 which connects the sub-carrier to an input terminal, an inverter 1212 which connects the sub-carrier to an input terminal, a second delayer 1213 which connects the signal output from inverter 1212 to an input terminal, and a selector 1214 which selectively outputs the signals output from first delayer 1211 or the output from second delayer 1213.

Second phase-converting means 122 comprises a third delayer 1221 which connects the sub-carrier to the input terminal, and a selector 1222 which selectively outputs the signals output from the sub-carrier or from third delayer 1221.

Figure 7A:
FIGS. 7A to 7C show the phase relation of the sub-carrier output in accordance with the circuit diagram of FIG. 6 during recording.
Figure 7B:
Figure 7C:
Figure 8A:
FIGS. 8A to 8C show the phase relation of the sub-carrier output in accordance with the circuit diagram of FIG. 6 during reproduction.
Figure 8B:
Figure 8C:

FIGS. 7A to 7C show the phase relation between the $I_0$ and $Q_0$ sub-carriers output from FIG. 6 under the VTR recording mode. FIG. 7A shows a burst signal, FIG. 7B shows a signal output from selector 1222, and FIG. 7C shows a signal output from selector 1214. FIGS. 8A to 8C show the phase relation between the $I_0$ and $Q_0$ sub-carriers output from FIG. 6 under the VTR reproduction mode. FIG. 8A shows a burst signal, FIG. 8B shows a signal output from selector 1222, and FIG. 8C shows a signal output from selector 1214.

Operation of the phase-converting circuit shown in FIG. 6 can be explained in more detail with reference to FIGS. 7A–7C and 8A–8C.

Referring to first phase-converting means 121, first delayer 1211 delays the sub-carrier output from oscillator 11 as shown in 7C, as compared with the phase of the burst signal of FIG. 7A, and then outputs the result. Simultaneously, inverter 1212 inverts the phase of the applied sub-carrier, which then is delayed as shown in FIG. 8C through second delayer 1213 and is output. The thus-delayed output signal is applied to selector 1214. Here, the signal output from second delayer 1213 is selected and output upon reproduction, and the signal output from first delayer 1211 is selected and output upon recording.

The sub-carrier is applied to second phase-converting means 122 simultaneously to first delayer 1211 and inverter 1212, and is delayed and output through third layer 1221 so as to have a phase shown in FIG. 8B with respect to a burst signal of FIG. 8A, and the undelayed sub-carrier is applied through another path. When the undelayed sub-carrier and the signal output from third delayer 1221 are applied, selector 1222 selects and outputs the signal output from third delayer 1221 during reproduction and the undelayed sub-carrier is selected and output during recording.

FIG. 9 is an embodiment of first, second and third delayers 1211, 1213 and 1221 shown in FIG. 6, and shows transistor Q1, resistances R1, R2 and R3, and a variable condenser (VC), wherein the gain (G) of the sub-carrier applied to the base terminal of transistor Q1 is controlled, to thereby correct the phase. Here, gain (G) can be expressed as follows.

$$G = \frac{(1 - j\omega VCR)}{(1 + j\omega VCR)}$$

As can be seen the above expression, gain (G) is variably controlled by variable condenser (VC).

When the phase correction circuits shown in FIG. 9 are fashioned as the delayers of FIG. 6, the $I_0$ and $Q_0$ outputs from phase-converting circuit 12 are output as shown in FIGS. 10C and 10D. Here, FIG. 10A shows a burst signal, FIG. 10B shows a sub-carrier, FIG. 10C shows an $I_0$-signal and FIG. 10D shows a $Q_0$-signal.

As described above, the present invention controls the phase of a sub-carrier to be synchronized with the burst signal of an applied video signal in a video camera system, to thereby enable a superimpose function even in a VTR mode.

What is claimed is:

1. A superimpose control device of a video camera system having a camera and a video recording and reproduction circuit, comprising:
   a memory for storing video signals output from said camera under a user's control, as title data;
   a luminance/chrominance signal separator for separating and outputting only a color signal from either the video signals output from the camera or video signals applied from an external video input terminal of said video camera system;
   an automatic color signal control circuit for controlling a color input signal in order to maintain a constant level for a color burst signal of the controlled color input signal, whereby the color input signal is either the color signal output from said signal separator or a color signal obtained from the video reproduction circuit;
   a phase difference detector for detecting and outputting a phase difference between a signal output from said automatic color signal control circuit and a sub-carrier signal;
   an oscillator for synchronizing the sub-carrier signal with a phase of the color burst signal in accordance with the phase difference output from said phase difference detector, and for outputting a synchronized sub-carrier signal;
   a phase-converting circuit for converting a phase of the synchronized sub-carrier signal in accordance with either a recording or a reproduction operation, and for outputting a phase-converted signal;
   a color modulator for modulating a color difference signal of the title data stored in said memory in accordance with the phase-converted signal;
   an adder for outputting a composite video signal, including the title data, by adding a signal output from said color modulator and a luminance signal of the title data stored in said memory; and a selector for selectively outputting a signal output from said adder and an alternative video signal applied to said video camera system.

2. A superimpose control device according to claim 1, wherein said phase-converting circuit comprises a first phase-converter for controlling the phase of the synchronized sub-carrier signal so as to be synchronized with a burst signal of a first color difference signal of the title data during either the recording or the reproduction operation, and a second phase-converter tab controlling the phase of the synchronized sub-carrier signal so as to be synchronized with a burst signal of a second color difference signal of the title data during either the recording or the reproduction operation.

3. A superimpose control device according to claim 2, wherein said first phase-converter outputs the synchronized sub-carrier signal inverted and delayed by a predetermined amount in the reproduction operation, and outputs the synchronized sub-carrier signal delayed by a predetermined amount in the recording operation, to thereby synchronize the burst signal of the title data with the phase of the sub-carrier signal.

4. A superimpose control device according to claim 2, wherein said second phase-converter outputs the synchronized sub-carrier signal delayed by a predetermined amount in the reproduction operation, and directly outputs the synchronized sub-carrier signal in the recording operation, to thereby synchronize the burst signal of the title data and the phase of the sub-carrier signal.

* * * * *